(12) United States Patent
O'Brien

(10) Patent No.: US 7,983,854 B2
(45) Date of Patent: Jul. 19, 2011

(54) METHOD AND APPARATUS FOR MONITORING A STRUCTURE

(75) Inventor: Edwin William O'Brien, Bristol (GB)

(73) Assignee: Airbus Operations Limited, Bristiol (GB)

( * ) Notice: Subject to any disclaimer, the term of this patent is extended or adjusted under 35 U.S.C. 154(b) by 58 days.

(21) Appl. No.: 12/401,915

(22) Filed: Mar. 11, 2009

(65) Prior Publication Data

US 2009/0265120 A1 Oct. 22, 2009

(30) Foreign Application Priority Data

Apr. 16, 2008 (GB) .................................. 0806918.9

(51) Int. Cl.
*G01L 1/22* (2006.01)
(52) U.S. Cl. .......... 702/42; 73/862.627; 356/33; 702/34
(58) Field of Classification Search .................... 702/42, 702/101, 104, 173, 174; 73/727, 780, 862.627, 73/862.629, 849; 33/533, 544.3, 544; 166/250.01; 384/448; 356/33
See application file for complete search history.

(56) References Cited

U.S. PATENT DOCUMENTS

| | | | |
|---|---|---|---|
| 4,566,336 A | 1/1986 | German et al. | |
| 4,815,547 A | 3/1989 | Dillon et al. | |
| 4,872,349 A | 10/1989 | Espiritu-Santo | |
| 5,440,499 A * | 8/1995 | Rasmussen | 702/43 |
| 6,082,203 A | 7/2000 | Koivisto et al. | |
| 6,273,613 B1 | 8/2001 | O'Brien et al. | |
| 6,415,242 B1 * | 7/2002 | Weldon et al. | 702/173 |
| 6,650,405 B2 * | 11/2003 | Lam et al. | 356/33 |
| 6,676,075 B2 | 1/2004 | Cowan et al. | |
| 6,769,315 B2 | 8/2004 | Stevenson et al. | |
| 6,895,681 B2 * | 5/2005 | Yonemura et al. | 33/544 |

FOREIGN PATENT DOCUMENTS

EP 0319176 A2 6/1989
WO 2006/067442 A1 6/2006

OTHER PUBLICATIONS

ISR for PCT/GB2005/004975 dated Feb. 27, 2006.
UK Search Report for GB0806918.9 dated Jul. 18, 2008.

* cited by examiner

*Primary Examiner* — John H Le
(74) *Attorney, Agent, or Firm* — Lowe, Hauptman, Ham & Berner, LLP

(57) ABSTRACT

The present disclosure discloses a method of monitoring a structure by a monitoring system including at least one strain gauge positioned on the structure and a computer processor coupled to the at least one strain gauge. According to at least one embodiment, strain data are acquired using the at least one strain gauge, and it is determined, by the computer processor, whether the structure has undergone plastic deformation according to the strain data. Further, a result is outputted according to the determination of plastic deformation.

20 Claims, 10 Drawing Sheets

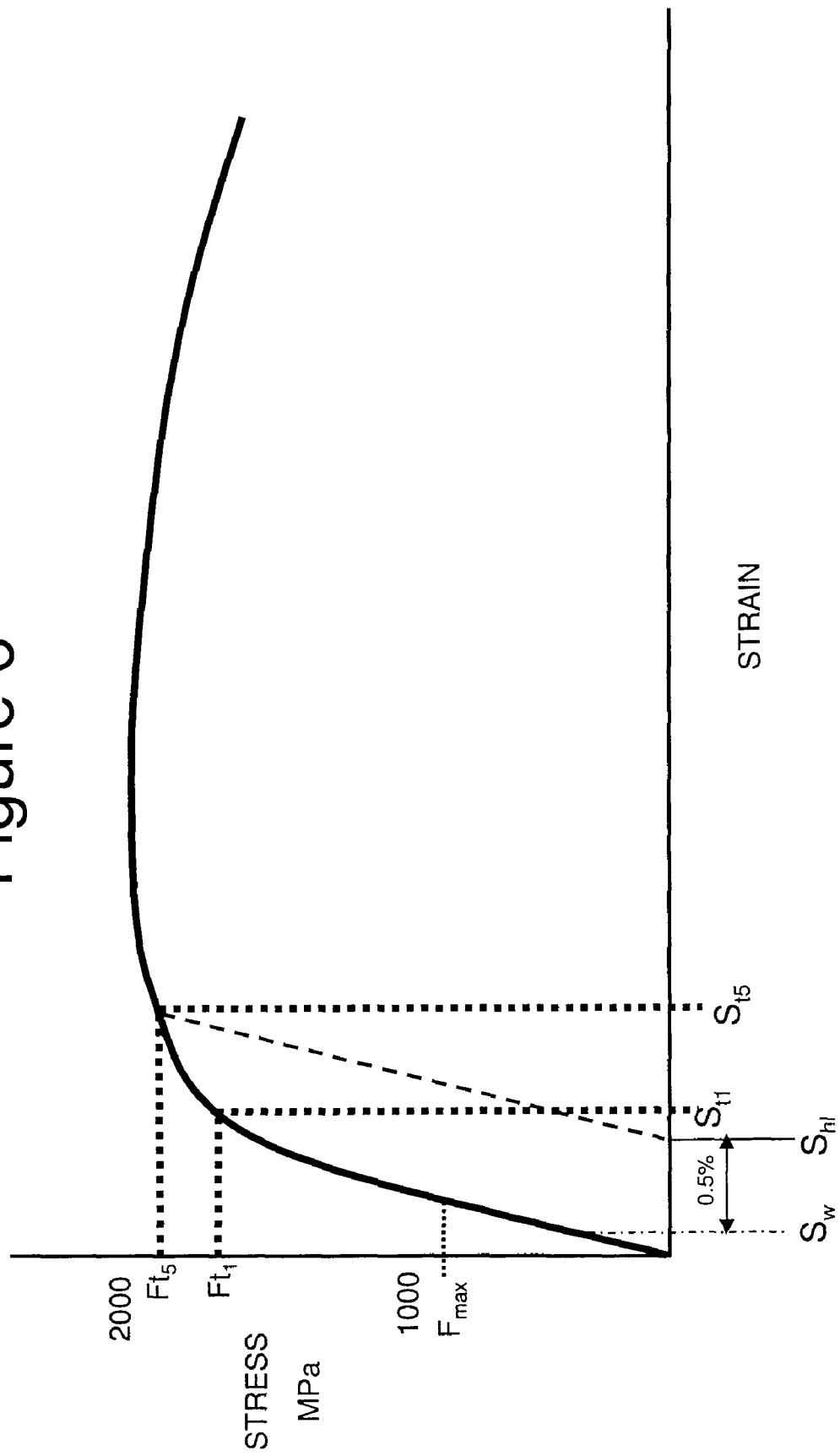

METHOD AND APPARATUS FOR MONITORING A STRUCTURE

RELATED APPLICATIONS

The present application is based on, and claims priority from, British Application Number 0806918.9, filed Apr. 16, 2008, the disclosure of which is hereby incorporated by reference herein in its entirety.

FIELD OF THE INVENTION

The present invention relates to a method and apparatus for monitoring a structure such as an aircraft landing gear.

BACKGROUND OF THE INVENTION

US-A-2003042354 describes the use of strain transducers throughout the structure of an aircraft, and analysis of their outputs to detect a hard landing. Various locations for the transducers are described including a trunion bolt which is deflected in bending. If a signal from a transducer exceeds its criteria then a processor illuminates an indicator light for the appropriate landing gear.

WO-A-0039542 describes a pin bearing with strain gauges which are used to measure ground loads applied to such pin bearings in aircraft landing gear.

A problem with the method employed in US-A-2003042354 is that it is difficult to achieve a reliable detection of a hard landing. If the "criteria" are set too high then there is a risk of not detecting a hard landing, but if they are set too low then there is a chance of generating a false indication of a hard landing.

SUMMARY OF THE INVENTION

A first aspect of the invention provides a method of monitoring a structure, the method comprising positioning one or more strain gauges on the structure; acquiring strain data with the gauges(s); analyzing the strain data to determine whether the structure has undergone plastic deformation; and providing an output in accordance with the analysis.

A second aspect of the invention provides apparatus for monitoring a structure, the apparatus comprising one or more strain gauges positioned on the structure; and a processor configured to receive strain data from the gauges(s), analyse the strain data to determine whether the structure has undergone plastic deformation, and provide an output in accordance with the analysis.

By analyzing the strain data to determine whether the structure has undergone plastic deformation, a more reliable determination can be made of whether the structure has experienced an excessively high loading event.

The strain data may be indicative of a deformation of the structure caused by bending forces as in US-A-2003042354. However more preferably at least one of the strain gauges is positioned in a region of substantially constant shear, particularly in the case where the structure is a pin bearing. This is preferred because the dominant loading action in a pin bearing is shear within a short beam. Any region of non-uniform shear will involve an element of bending which is more difficult to analyze.

In a preferred embodiment the structure comprises a pin bearing comprising at least two elements defining adjacent axially separated bearing surfaces which bear on a pin, and at least one of the strain gauges is positioned on the pin and axially aligned with an interface between the axially separated bearing surfaces.

The strain data from the gauge(s) is typically analyzed by comparing the strain data with a threshold.

The strain data may be acquired by the gauge(s) during a transient loading event such as a suspected hard landing of an aircraft, or the lifting of an excessive load by a crane. The strain data acquired during the transient loading event can then be analyzed to determine whether the structure has undergone plastic deformation during the transient loading event. In this case the threshold will be set at or above an elastic limit of the structure—that is, a strain value beyond which plastic deformation will occur in the structure. Typically the threshold is set at above a value associated with a plastic residual strain of 0.1%, and more preferably it is set at or above a value associated with a plastic residual strain of 0.5%.

Alternatively the strain data may be acquired by the gauge(s) after such a transient loading event. In this case the strain data acquired after the transient loading event is analyzed to determine whether residual strain due to plastic deformation is retained in the structure after the transient loading event. This method obviates the need for high speed data logging to ensure that the peak strain value is reliably recorded. In this case the threshold may be zero, or a small strain value chosen to avoid false positives.

Furthermore both techniques (that is, acquisition and analysis of data both during and after the transient loading event) may be employed and compared with each other as a cross-check.

In the case where the strain data is acquired after a transient loading event, then the gauge(s) may be receiving substantially no power during the transient loading event, and power supplied to the gauges(s) after the transient loading event in order to acquire the strain data. This enables the strain gauges to be powered by a portable battery which is not carried on the aircraft, and connected to the strain gauges only when required.

The structure may comprise a pin as described in WO-A-0039542, or a pin with an internal or external annular groove. A pin with an annular groove is preferred because it enables the pin to deform plastically in a predictable manner. The depth of the groove can also be varied to tune the failure load of the pin, so that it can act as a so-called "crash fuse". Where a groove is provided, then preferably at least one of the strain gauges is positioned in the annular groove.

The invention may be used to monitor any structure where a critical overload condition must be identified and recorded. For instance the invention may be used to determine an abnormal landing of an aircraft (such as a hard landing); to determine excessive load in a control surface of an aircraft such as an elevator during a rapid descent of the aircraft; or to determine an excessive load in another structure such as a shackle pin in a crane cable.

The output of the method may take a variety of forms, including but not limited to:
- a light which is illuminated in the event that the processor determines that the structure has undergone plastic deformation
- a light which changes colour in the event that the processor determines that the structure has undergone plastic deformation
- digital data which is output to the central maintenance computer of the aircraft
- an audio alarm.

BRIEF DESCRIPTION OF THE DRAWINGS

Embodiments of the invention will now be described with reference to the accompanying drawings, in which:

FIG. 6 is a graph of stress against strain.

DETAILED DESCRIPTION OF EMBODIMENT(S)

Figure 1:
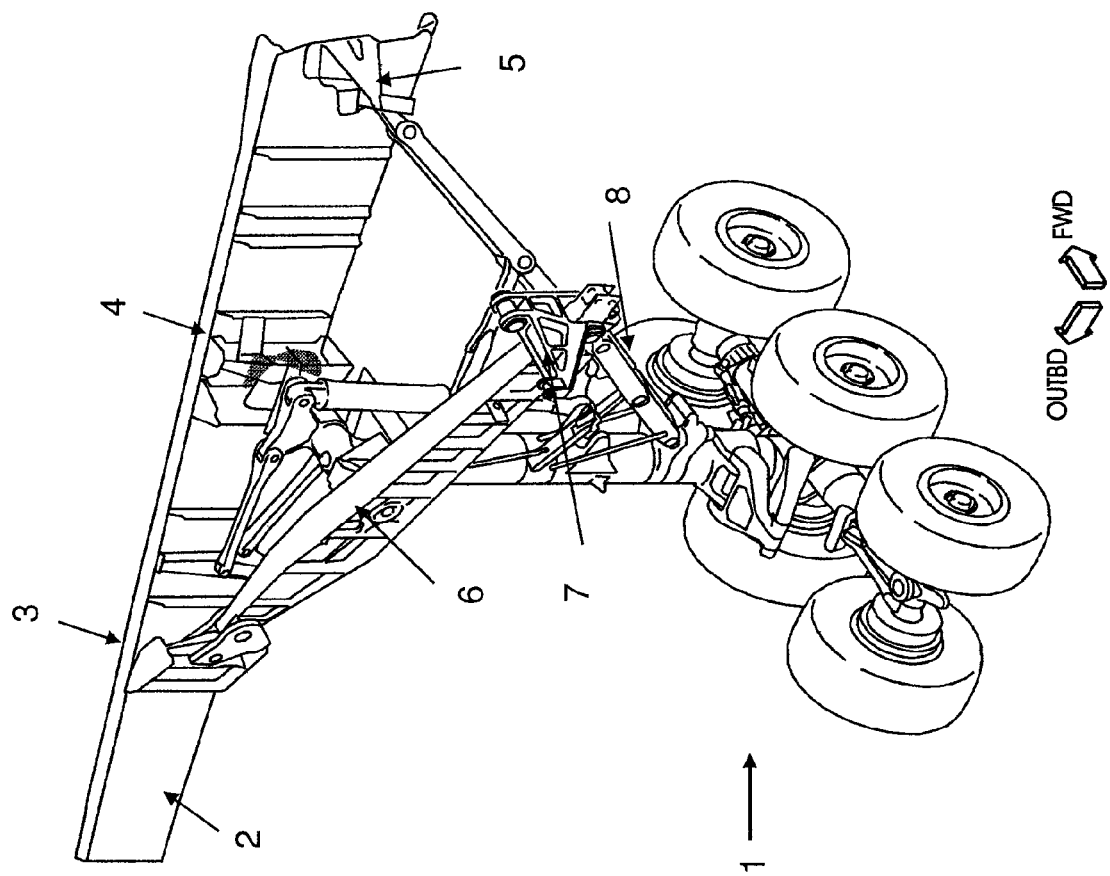
FIG. 1 is a perspective view of a two gear beam and double sidestay landing gear.

FIG. 1 shows a landing gear 1 attached to a wing spar 2 by an outboard fitting 3, forward pintle bearing 4 and sidestay 5. The landing gear also comprises an aft pintle 6, swinging link 7 and sidestay 8. Each of the elements 3-8 includes a pin bearing which provides a unique load path through which an overload due to a hard landing must pass. One or more of the pin bearings has the configuration shown in FIG. 2.

Figure 2:
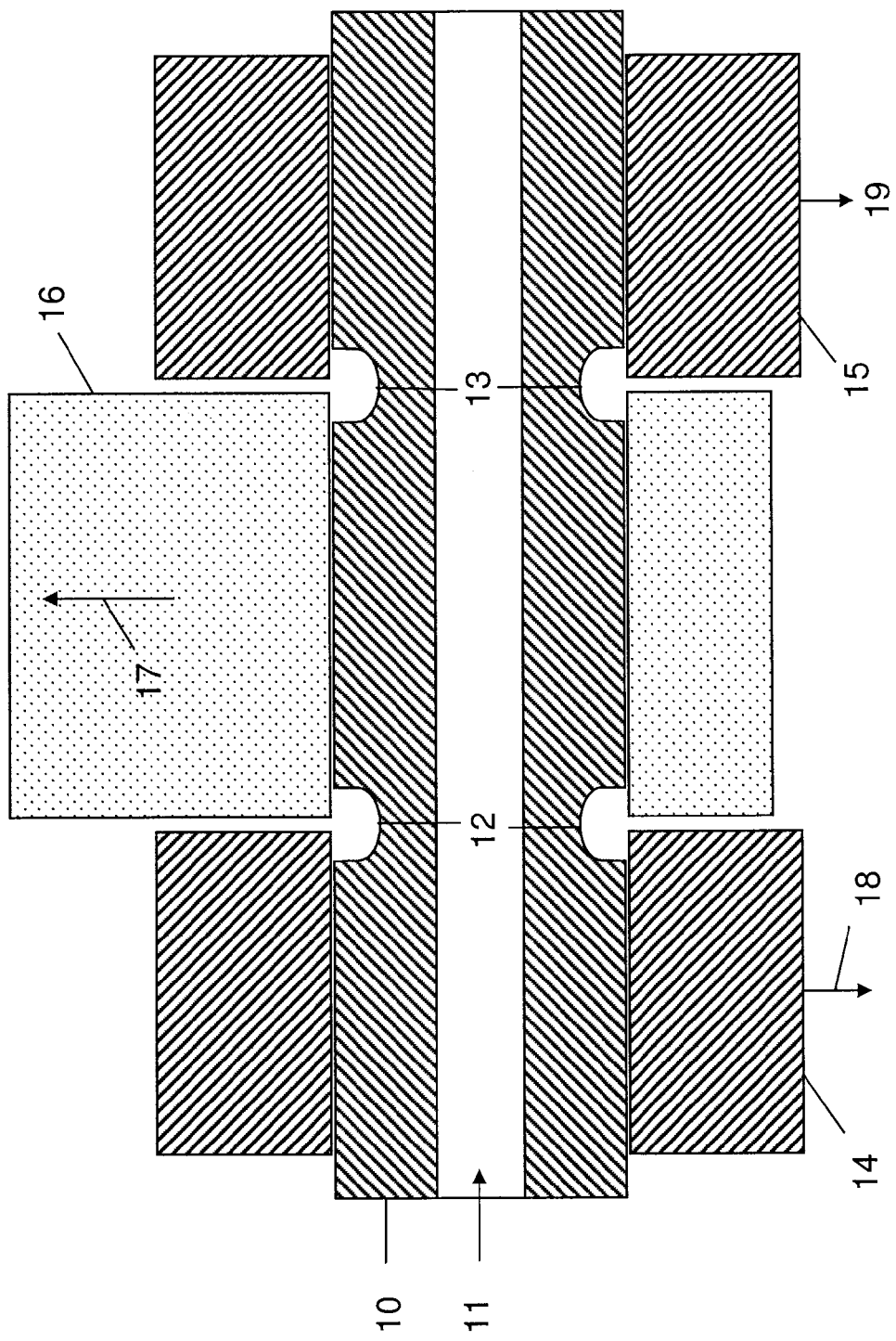
FIG. 2 is a cross sectional view through a bearing of the landing gear of FIG. 1.

The pin bearing shown in FIG. 2 comprises a cylindrical pin 10 with an internal bore 11 and two annular grooves 12, 13 on the external surface of the pin 10. The pin 10 provides a bearing between a pair of arms 14, 15 and an arm 16. The arms 14, 15 may for example comprise the arms of a shackle. The arms 14-16 define adjacent axially separated bearing surfaces which bear on the pin 10. The external annular grooves 12, 13 are axially aligned with the interfaces between the axially separated bearing surfaces in regions of substantially constant shear. In use, forces on the landing gear cause the arm 16 to be forced up as indicated by arrow 17, and the arms 14, 15 to be forced down as indicated by arrows 18, 19. Since the pin 10 has a relatively low aspect ratio, bending effects should be small.

Figure 3:
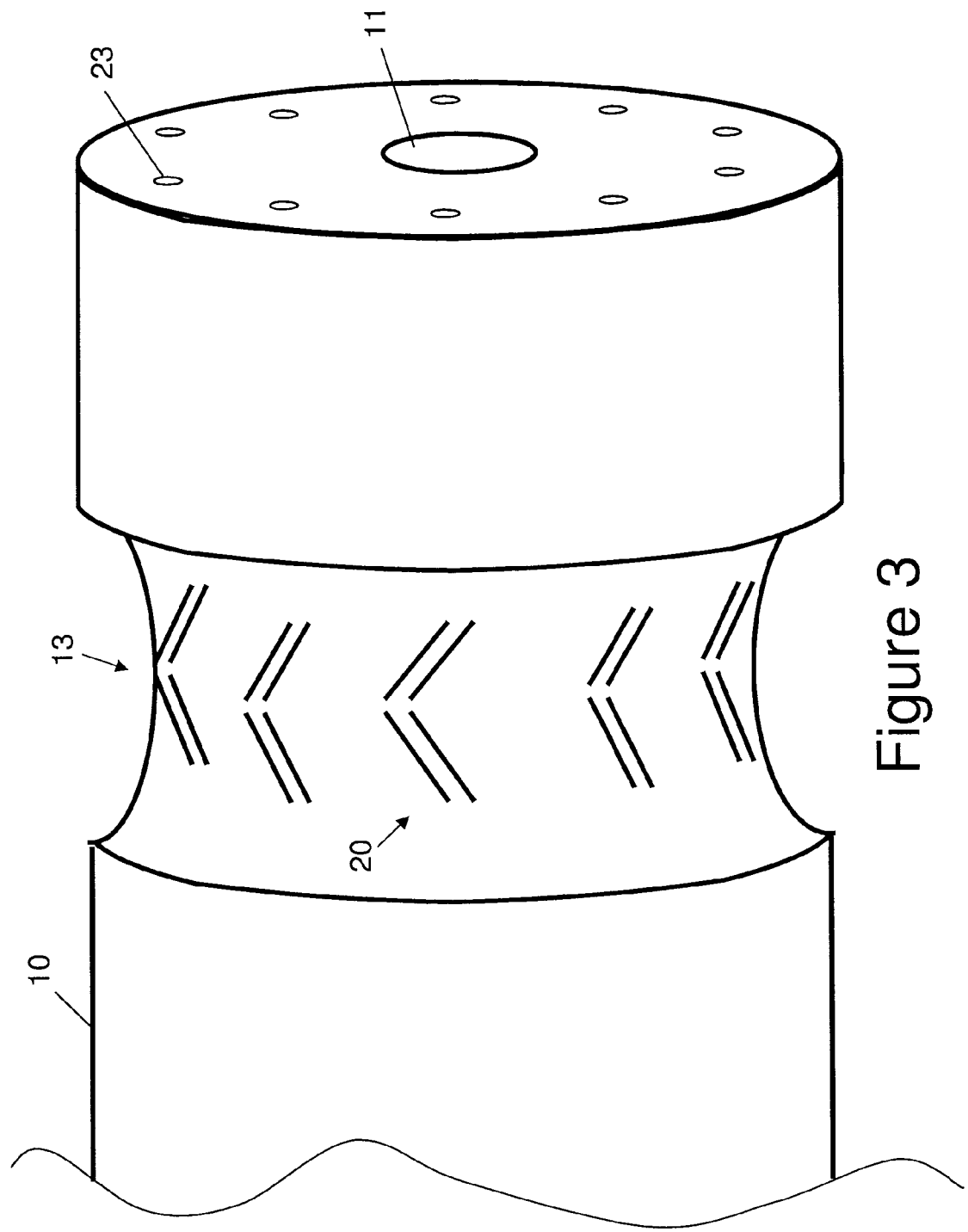
FIG. 3 is a perspective view showing one end of the pin.

A perspective view of one end of the pin 10 is shown in FIG. 3. The external annular groove 13 carries a number of shear strain gauges 20 which are distributed around its periphery. The strain gauges 20 are bonded to the centre of the groove under an inert atmosphere and hermetically sealed. Five of such strain gauges are shown in FIG. 3 but in practice any number may be distributed around the groove 13. Multiple gauges make the array of strain gauges insensitive to load distribution and provide redundancy for security of detection. Suitable strain gauge are the TK or WA class TK (or WA)-XX-T032P-350/DP, available from Vishay® (see Vishay.com) where XX would be selected according to the material of the pin 10. The annular grooves 12, 13 create regions of substantially constant shear force, and the associated shear strain is measured by the strain gauges 20.

Figure 4:
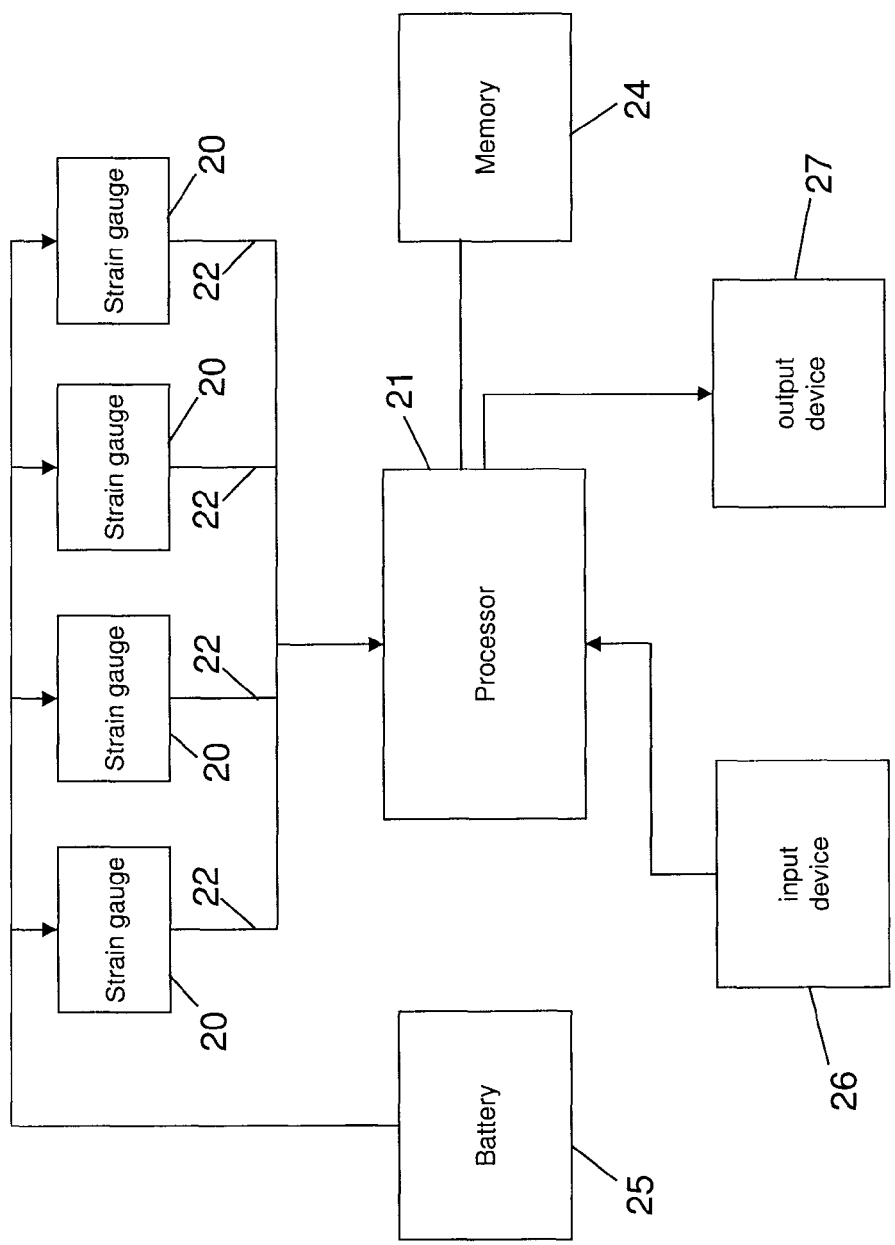
FIG. 4 is a block diagram showing the electronics of the system.

The strain gauges 20 are coupled to a processor 21 shown in FIG. 4 via wires 22 which pass along axial holes 23 in the pin, shown in FIG. 3. Means (not shown) may be provided for fixing the pin against rotation so that these wires 22 do not become twisted. The processor 21 is configured to receive strain data from the gauges 20 and store the data in a memory 24 for subsequent analysis.

Figure 5:
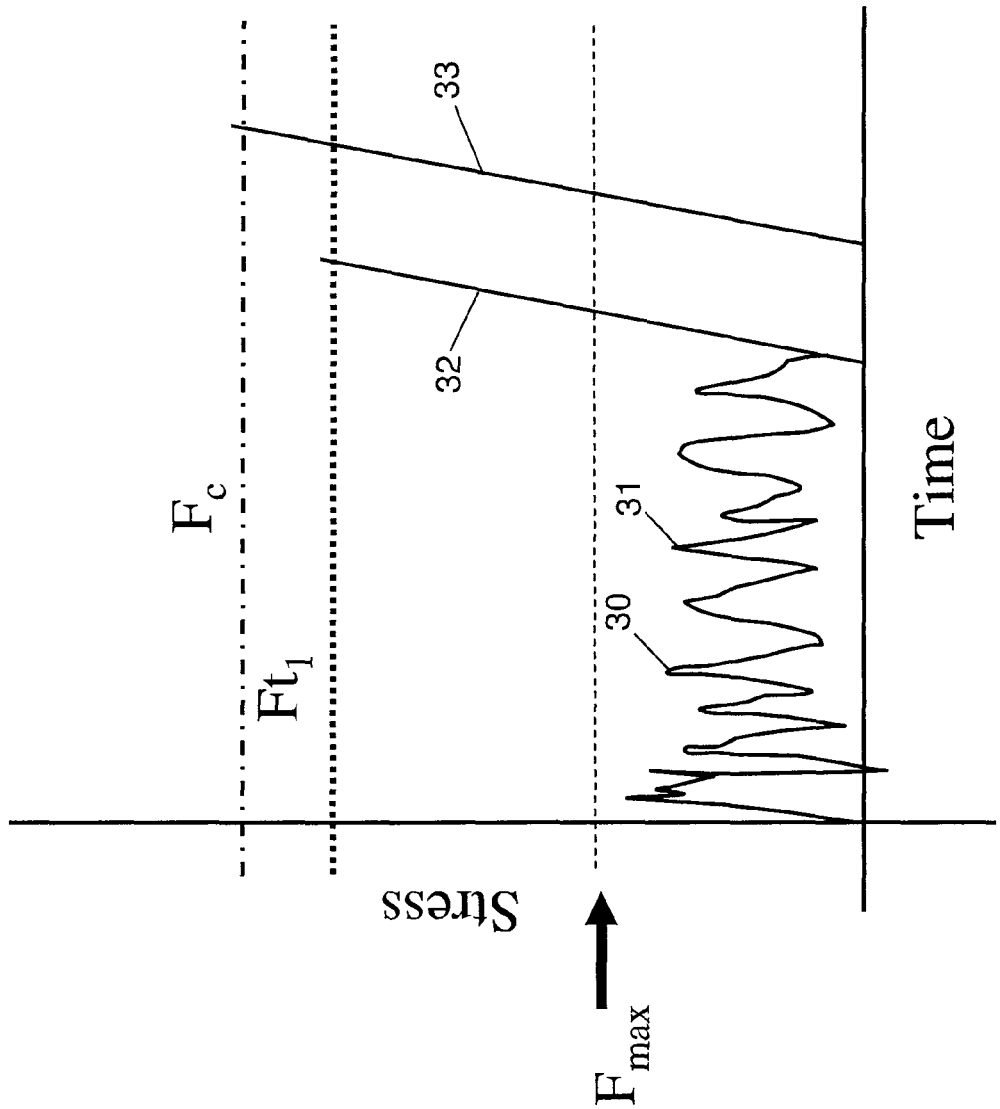
FIG. 5 is a graph of stress against time.

FIG. 5 is a graph showing a typical variation of stress in the pin 10 over time. During normal operation of the aircraft, the stress varies cyclically as shown, with peaks 30, 31, etc. coinciding with normal landing forces. Thus in general, during normal use of the aircraft, the cyclic stress in the pin 10 will typically not exceed a maximum stress level $F_{max}$ shown in FIG. 5. In the event of a hard landing, then the stress increases significantly above $F_{max}$ as shown at 32. If the stress exceeds a plastic deformation threshold $Ft_1$, then the pin 10 will deform plastically. If the stress exceeds a catastrophic stress limit $F_c$ as indicated by line 33 (for instance, during a crash landing) then the pin will fail completely—the pin acts as a safety device in such a crash landing.

FIG. 6 shows a typical stress versus strain graph for the pin 10. The graph is approximately linear up to a plastic deformation stress limit $Ft_1$ (which corresponds with a plastic deformation strain limit of $S_{t1}$). $Ft_1$ is defined as the stress which causes a residual strain of 0.1%. $Ft_5$ and its associated strain value $S_{t5}$ are also shown in FIG. 6. $Ft_5$ is defined as the stress which causes a plastic residual strain of 0.5%.

If the stress applied during a hard landing is $Ft_5$, then after the hard landing a strain reading $S_{h1}$ will be made by the strain gauges. This is made up of a strain $S_w$ due to the weight of the aircraft and a residual strain of 0.5%. The typical maximum cyclic stress $F_{max}$ during normal operation is also shown in FIG. 6.

The pin is designed and calibrated to ensure that it starts to exhibit plasticity at a predetermined hard landing load.

Figure 7:
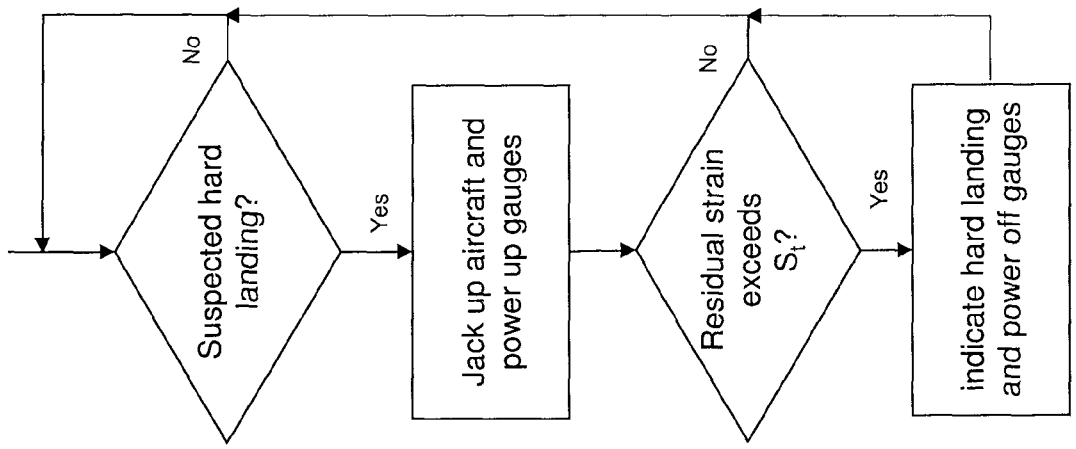
FIG. 7 is a flow diagram showing a first method of detecting a hard landing.

A first method of detecting a hard landing of the aircraft is shown in FIG. 7. During normal flight operations, the battery 25 is not connected to the strain gauges 20. Thus, during normal flight of the aircraft, no strain data is being acquired by the strain gauges 20 or received by the processor 21. However, in the event that the pilot suspects that there has been a hard landing, then the aircraft is jacked up to lift the wheels of the landing gear off the ground and thus remove gravitational load in the landing gear caused by the weight of the aircraft.

An operator then connects the battery 25 to the strain gauges 20. The strain readings of the various strain gauges are then received and recorded in the memory 24. The processor 21 then determines whether any of these strain data readings exceeds $S_t$, where $S_t$ is a small residual strain threshold value which is selected to be sufficiently high to avoid false positives. If the strain data readings do not exceed $S_t$ then no hard landing has occurred. If the strain data readings do exceed $S_t$ then the processor 21 indicates a hard landing via an output device 27 which may be for example a warning light, or a computer screen alert giving further details of the hard landing data. This invokes maintenance action governed by the aircraft Maintenance Manual instructions. Conversely if the threshold has not been exceeded then procedures can be taken to return the aircraft to service with no further action apart from logging the incident.

Thus the system acts like a switch to indicate whether the load criteria is exceeded in an unambiguous and instant manner.

Figure 8:
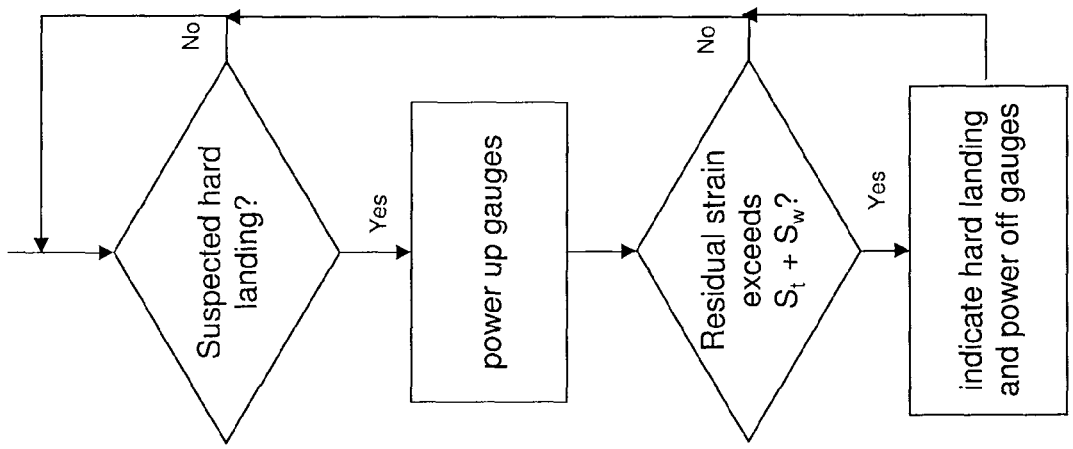
FIG. 8 is a flow diagram showing a second method of detecting a hard landing.

Another method of detecting a hard landing is shown in FIG. 8. The method has similarities with the method shown in FIG. 7, except in this instance the aircraft is not jacked up, and the residual strain is compared with $S_t+S_w$ where $S_w$ is a previously estimated strain value due to the weight of the aircraft including the landing gear.

Figure 9:
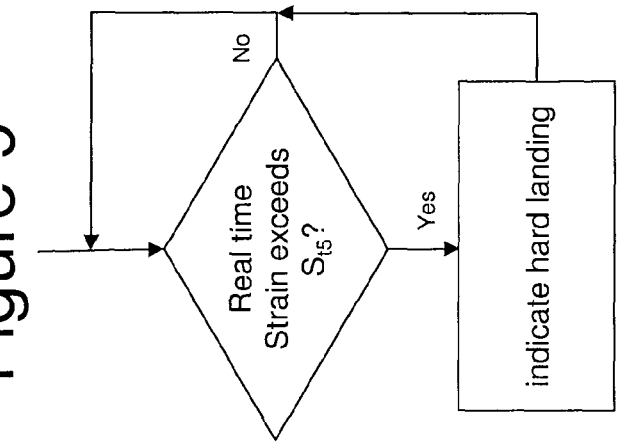
FIG. 9 is a flow diagram showing a third method of detecting a hard landing.

FIG. 9 shows a third method of detecting a hard landing that also does not require the aircraft to be jacked up. In this case the strain gauges are powered up permanently or at the same time as deploying the landing gear during a landing. During the landing, the strain gauges continuously acquire real time strain data measurements to determine the load experienced during the landing. If at any time during the landing any of the real time strain data measurements exceeds $S_{r5}$, then a hard landing indication is generated by the processor and output on the display device 27. If necessary, following an indication that the real time strain data has exceeded $S_{r5}$, as shown in FIG. 9, one of the methods of FIG. 7 or FIG. 8 may be performed as a cross check.

Note that a variety of other threshold values may be used in the method of FIG. 9, including a lower threshold value such as $S_{r1}$, or a much higher threshold value such as $S_{r200}$ (corresponding to $Ft_{200}$ which is the stress which causes a residual strain of 20%).

Figure 10:
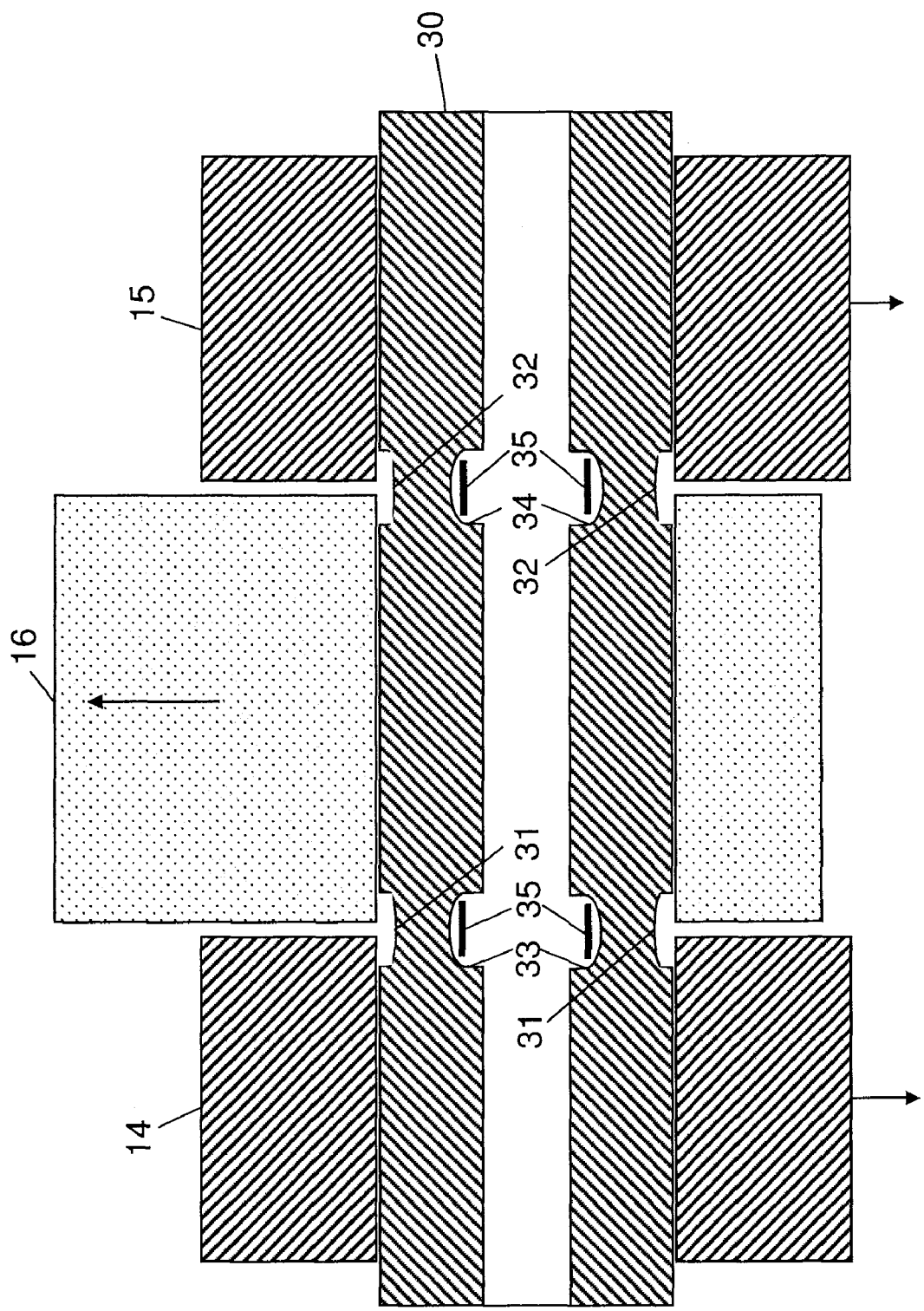
FIG. 10 is a cross-sectional view through an alternative pin bearing.

FIG. 10 shows an alternative pin bearing arrangement. The arms 14-16 are identical to the arms shown in FIG. 2 and the same reference numerals are used. In this case, the pin 30 has two external annular grooves 31, 32 and two internal annular grooves 33, 34 which are located at substantially the same axial position along the pin, overlapping with the interfaces between the arms 14-16. Shear strain gauges are positioned in the internal annular grooves 33, 34. Four of such gauges are indicated at 35 in FIG. 10, but further gauges may also being mounted in the internal grooves out of the plane of the cross section of FIG. 10. Note that the internal annular grooves 33, 34 are deeper than the external annular grooves 31, 32. The use of shallow external grooves 31, 32 is preferred because the exterior of the pin is more fatigue sensitive than the internal surface of the pin (that is, the wall of the bore). The depth of the internal grooves 33, 34 can be varied to tune the failure load of the pin if the pin is required to act as a so-called "crash fuse".

Figure 11:
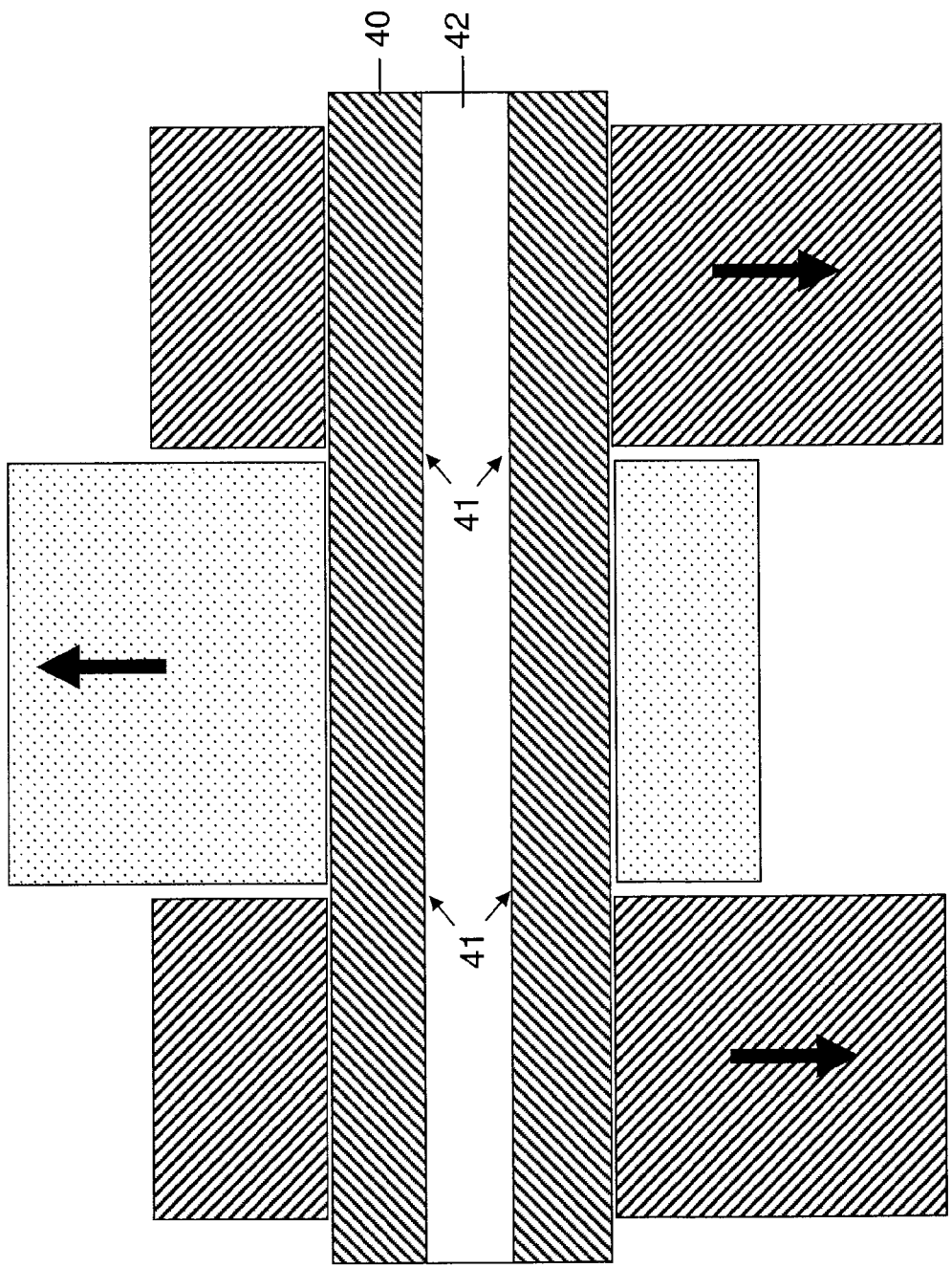
FIG. 11 is a cross-sectional view through a further alternative bearing.
Figure 12:
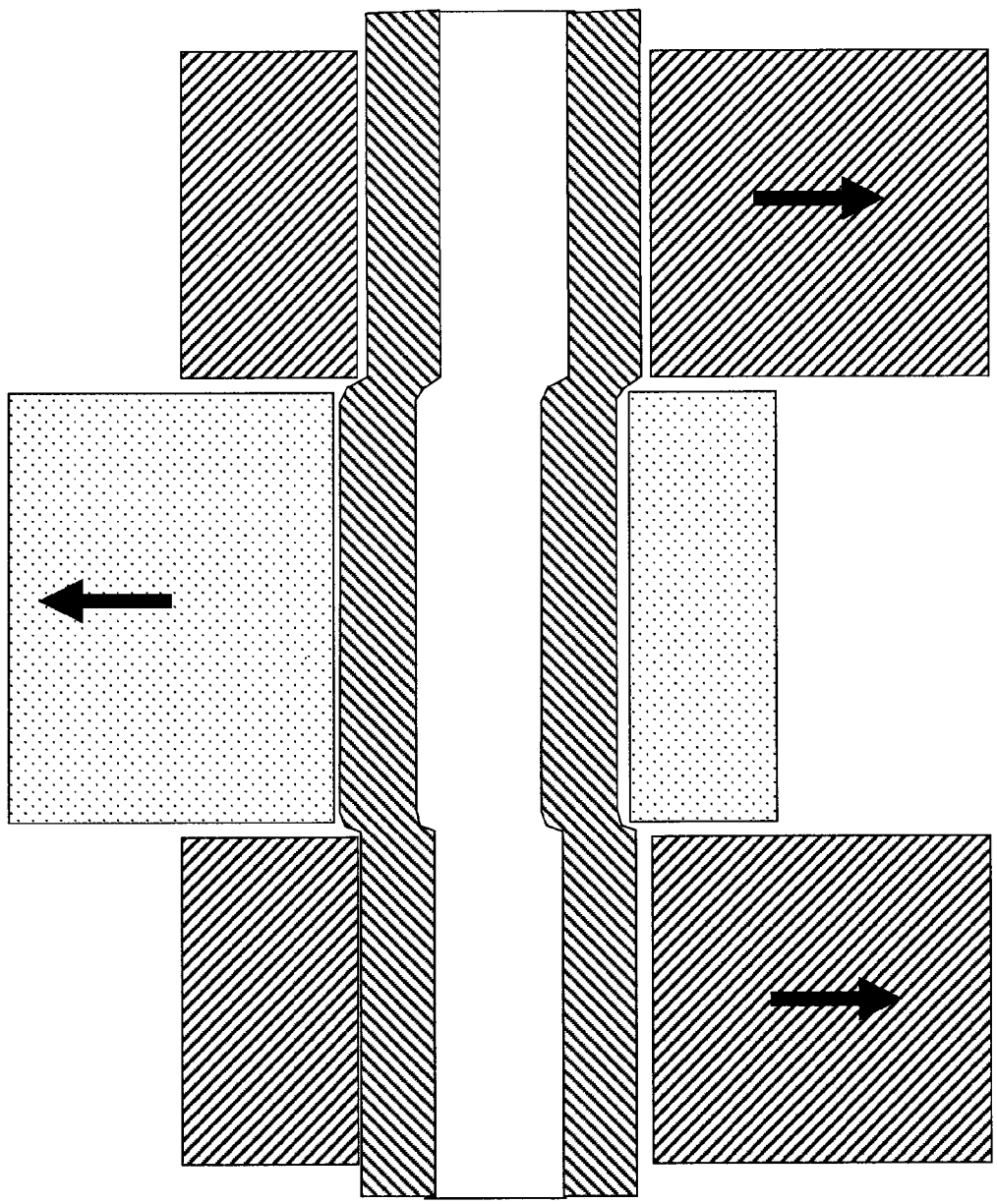
FIG. 12 is a cross sectional view through the bearing of FIG. 11 after the bearing has deformed plastically.

A further pin bearing arrangement is shown in FIG. 11. In this case, the pin 40 has no annular grooves and carries shear strain gauges (not shown) which are mounted within a bore 42 at positions generally indicated at 41. As the bearing deforms plastically, as shown in FIG. 12, the strain gauges 41 generate residual strain readings indicative of plastic deformation.

In a further pin bearing arrangement (not shown), the pin 10 shown in FIGS. 2 and 3 may carry the strain gauges on the inside, instead of being mounted in the external grooves 12, 13.

Although the invention has been described above with reference to one or more preferred embodiments, it will be appreciated that various changes or modifications may be made without departing from the scope of the invention as defined in the appended claims.

The invention claimed is:

1. A method of monitoring a structure by a monitoring system comprising at least one strain gauge positioned on the structure and a computer processor coupled to the at least one strain gauge, the method comprising:
    acquiring strain data using the at least one strain gauge;
    determining, by the computer processor, whether the structure has undergone plastic deformation according to the strain data; and
    outputting a result according to the determination of plastic deformation.

2. The method of claim 1, wherein the at least one strain gauge is positioned in a region of substantially constant shear.

3. The method of claim 1, wherein the determination of plastic deformation comprises comparing the strain data with a threshold.

4. The method of claim 1, wherein the acquiring strain data is performed during a transient loading event, and the determination of plastic deformation is performed based on the strain data acquired during the transient loading event.

5. The method of claim 1 wherein the acquiring strain data is performed after a transient loading event, and the determination of plastic deformation comprises determining whether a residual strain due to plastic deformation is retained in the structure after the transient loading event based on the strain data acquired after the transient loading event.

6. The method of claim 5 further comprising:
    supplying substantially no power to the at least one gauge during the transient loading event; and
    supplying power to the at least one gauge after the transient loading event in order to acquire the strain data.

7. The method of claim 5, further comprising lifting the structure to at least partially remove a gravitational load in the structure caused by at least a gravitational force, wherein the acquiring strain data is performed after the structure has been lifted.

8. The method of claim 1, further comprising estimating a gravitational load in the structure caused by at least a gravitational force, wherein the determination of plastic deformation is performed further according to the estimated gravitational load.

9. A method of determining an abnormal landing of an aircraft, the method comprising monitoring a structure of the aircraft by the method of claim 1.

10. An apparatus for monitoring a structure, comprising:
    one or more strain gauges positioned on the structure; and
    a processor coupled to the one or more gauges and configured to receive strain data from the one or more gauges, to analyse the strain data to determine whether the structure has undergone plastic deformation, and to output a result according to the determination of plastic deformation.

11. The apparatus of claim 10 wherein the structure comprises a pin with an annular groove.

12. The apparatus of claim 11 wherein at least one of the one or more strain gauges is positioned in the annular groove.

13. The apparatus of claim 11 wherein the structure comprises a pin with an internal annular groove and an external annular groove located at substantially the same axial position along the pin.

14. The apparatus of claim 13 wherein at least one of the one or more strain gauges is positioned in the internal annular groove.

15. The apparatus of claim 13 wherein the internal annular groove is deeper than the external annular groove.

16. The apparatus of claim 10, wherein the structure comprises:
    a pin bearing comprising at least two elements defining adjacent axially separated bearing surfaces which bear on a pin; and
    at least one of the strain gauges is positioned on the pin and axially aligned with an interface between the axially separated bearing surfaces.

17. The apparatus of claim 10, further comprising a memory coupled to the processor, the memory is arranged for storing the strain data received from the one or more gauges.

18. The apparatus of claim 10, further comprising an output device coupled to the processor, the output device is arranged for indicating a result outputted from the processor.

19. The apparatus of claim 18, wherein the output device is a warning light.

20. The apparatus of claim 10, further comprising a battery selectively coupled to the one or more gauges.

* * * * *